United States Patent
Indika de Silva et al.

(12) United States Patent (10) Patent No.: US 7,499,295 B2
(45) Date of Patent: Mar. 3, 2009

(54) SWITCH MODE POWER SUPPLY CONTROLLERS

(75) Inventors: Mahesh Devarahandi Indika de Silva, Cambridge (GB); Jay Kumar, Cambridge (GB); Vinod A. Lalithambika, Cambridge (GB)

(73) Assignee: Cambridge Semiconductor Limited, Cambridge (GB)

( * ) Notice: Subject to any disclaimer, the term of this patent is extended or adjusted under 35 U.S.C. 154(b) by 0 days.

(21) Appl. No.: 11/810,739

(22) Filed: Jun. 7, 2007

(65) Prior Publication Data

US 2008/0037294 A1   Feb. 14, 2008

Related U.S. Application Data

(63) Continuation of application No. 11/445,474, filed on Jun. 1, 2006, now Pat. No. 7,248,487.

(30) Foreign Application Priority Data

May 23, 2006   (GB)   ................................ 0610206.5

(51) Int. Cl.
*H02M 3/335* (2006.01)
*H02M 7/217* (2006.01)

(52) U.S. Cl. .................... 363/21.18; 363/21.12; 363/97

(58) Field of Classification Search .................. 363/18, 363/19, 20, 21.01, 21.04, 21.08, 21.1, 21.11, 363/21.12, 21.16, 21.18, 97, 131
See application file for complete search history.

(56) References Cited

U.S. PATENT DOCUMENTS

| | | | |
|---|---|---|---|
| 4,439,822 A | 3/1984 | Cocconi | |
| 4,672,516 A | 6/1987 | Ney et al. | |
| 4,739,462 A * | 4/1988 | Farnsworth et al. | 363/21.16 |
| 4,858,094 A | 8/1989 | Barlage | |
| 5,305,192 A * | 4/1994 | Bonte et al. | 363/21.16 |
| 5,940,281 A | 8/1999 | Wolf | |
| 6,301,135 B1 | 10/2001 | Mammano et al. | |
| 6,333,624 B1 | 12/2001 | Ball et al. | |
| 6,373,726 B1 | 4/2002 | Russell | |
| 6,385,059 B1 | 5/2002 | Telefus et al. | |
| 6,707,283 B1 | 3/2004 | Ball | |

(Continued)

FOREIGN PATENT DOCUMENTS

WO    WO-8603902 A1    7/1986

(Continued)

OTHER PUBLICATIONS

"International Application Serial No. PCT/GB2007/050232, International Search Report mailed Feb. 4, 2008", 8 pgs.

*Primary Examiner*—Gary L Laxton
(74) *Attorney, Agent, or Firm*—Schwegman, Lundberg & Woessner, P.A.

(57) ABSTRACT

This invention generally relates to discontinuous conduction mode switch mode power supply (SMPS) controllers employing primary side sensing. We describe an SMPS controller which integrates a feedback signal from a point determined by a target operating voltage to a peak or trough of an oscillatory or resonant portion of the feedback signal when substantially no energy is being transferred to the SMPS output. When regulation is achieved this value should be zero; the difference from zero can be used to regulate the output voltage of the SMPS.

17 Claims, 4 Drawing Sheets

U.S. PATENT DOCUMENTS

| | | |
|---|---|---|
| 6,721,192 B1 | 4/2004 | Yang et al. |
| 6,836,415 B1 | 12/2004 | Yang et al. |
| 6,862,198 B2 | 3/2005 | Muegge et al. |
| 6,882,552 B2 | 4/2005 | Telefus et al. |
| 6,900,995 B2 | 5/2005 | Muegge et al. |
| 6,956,750 B1 | 10/2005 | Eason et al. |
| 6,958,920 B2 | 10/2005 | Mednik et al. |
| 6,972,969 B1 | 12/2005 | Shteynberg et al. |
| 6,977,824 B1 | 12/2005 | Yang et al. |
| 6,985,368 B2 | 1/2006 | Park |
| 6,999,324 B2 | 2/2006 | Feldtkeller |
| 7,016,204 B2 | 3/2006 | Yang et al. |
| 7,027,312 B2 | 4/2006 | Park |
| 7,088,599 B1 | 8/2006 | Muska et al. |
| 7,116,564 B2 | 10/2006 | Takahashi |
| 7,248,487 B1 | 7/2007 | Indika de Silva et al. |
| 2002/0015315 A1 | 2/2002 | Telefus |
| 2005/0024898 A1 | 2/2005 | Yang et al. |
| 2005/0073862 A1 | 4/2005 | Mednik et al. |
| 2005/0169017 A1 | 8/2005 | Muegge et al. |
| 2005/0276083 A1 | 12/2005 | Berghegger |
| 2005/0285587 A1 | 12/2005 | Yang et al. |
| 2006/0034102 A1 | 2/2006 | Yang et al. |
| 2006/0050539 A1 | 3/2006 | Yang et al. |
| 2006/0055433 A1 | 3/2006 | Yang et al. |
| 2006/0056204 A1 | 3/2006 | Yang et al. |

FOREIGN PATENT DOCUMENTS

| | | |
|---|---|---|
| WO | WO-03047079 A2 | 6/2003 |
| WO | WO-2004082119 A2 | 9/2004 |
| WO | WO-2004112226 A1 | 12/2004 |
| WO | WO-2004112227 A1 | 12/2004 |
| WO | WO-2005011095 A1 | 2/2005 |
| WO | WO-2005048442 A1 | 5/2005 |
| WO | WO2006067522 | 6/2006 |
| WO | WO-2006067522 A2 | 6/2006 |
| WO | WO-2006067523 A2 | 6/2006 |
| WO | WO2007003967 | 1/2007 |
| WO | WO-2007003967 A2 | 1/2007 |

\* cited by examiner

SWITCH MODE POWER SUPPLY CONTROLLERS

RELATED APPLICATION

This application is a continuation of U.S. patent application Ser. No. 11/445,474, filed Jun. 1, 2006, now U.S. Pat. No. 7,248,487 which application claims priority under 35 U.S.C. 119 from United Kingdom Application No. 0610206.5 filed 23 May 2006, which application is incorporated herein by reference.

FIELD OF THE INVENTION

This invention generally relates to a switch mode power supply (SMPS) controllers and to related methods, and more particularly to SMPS controllers employing primary side sensing.

BACKGROUND TO THE INVENTION

Broadly speaking in a switch mode power supply a magnetic energy storage device such as a transformer or inductor is used to transfer power from an input side to an output side of the SMPS. A power switch switches power to the primary side of the energy storage device, during which period the current and magnetic field builds up linearly. When the switch is opened the magnetic field (and secondary side current) decreases substantially linearly as power is drawn by the load on the output side.

An SMPS may operate in either a discontinuous conduction mode (DCM) or in continuous conduction mode (CCM) or at the boundary of the two in a critical conduction mode. In this specification we are particularly concerned with DCM operating modes in which, when the switching device is turned off, the output voltage steadily, but gradually, declines until a point is reached on the knee of the output curve at which substantially zero output current flows an the inductor or transformer begins to ring, entering a so-called oscillatory phase. The period of the ringing is determined by the inductance and parasitic capacitance of the circuit. In this specification DCM includes so-called critical (discontinuous conduction) mode (CRM) operation in which the power switch is turned on again at the first trough of the oscillatory phase (sometimes referred to as the flyback oscillation). Operation in CRM can be particularly efficient by reducing losses associated with the power switch turn-off transition.

Often the output voltage of an SMPS is regulated by sensing circuitry on the output side, coupled back to the input side of the SMPS by means of an opto-isolator. However some improved techniques employ primary side sensing or, more generally, sensing employing an auxiliary winding on the magnetic energy storage device, or in some related circuits an auxiliary winding of an output filter inductor.

Some background prior art relating to primary side sensing can be found in U.S. Pat. No. 6,958,920; U.S. Pat. No. 6,721,192; US2002/015315; WO 2005/048442; WO 2004/051834; US2005/0024898; US2005/0169017; U.S. Pat. No. 6,956,750; U.S. Pat. No. 6,862,198; US 2006/0056204; U.S. Pat. No. 7,016,204; US 2006/0050539; US 2006/0055433; US 2006/0034102; U.S. Pat. No. 6,862,198; and U.S. Pat. No. 6,836,415. Still further background prior art can be found in U.S. Pat. No. 6,385,059, US20050276083, U.S. Pat. No. 6,977,824, U.S. Pat. No. 6,956,750, U.S. Pat. No. 6,900,995, WO2004082119, U.S. Pat. No. 6,972,969, WO03047079, U.S. Pat. No. 6,882,552, WO2004112227, US2005285587, WO2004112226, WO2005011095, U.S. Pat. No. 6,985,368, U.S. Pat. No. 7,027,312, U.S. Pat. No. 6,373,726, U.S. Pat. No. 4,672,516, U.S. Pat. No. 6,301,135, U.S. Pat. No. 6,707,283, and U.S. Pat. No. 6,333,624.

Figure 1:
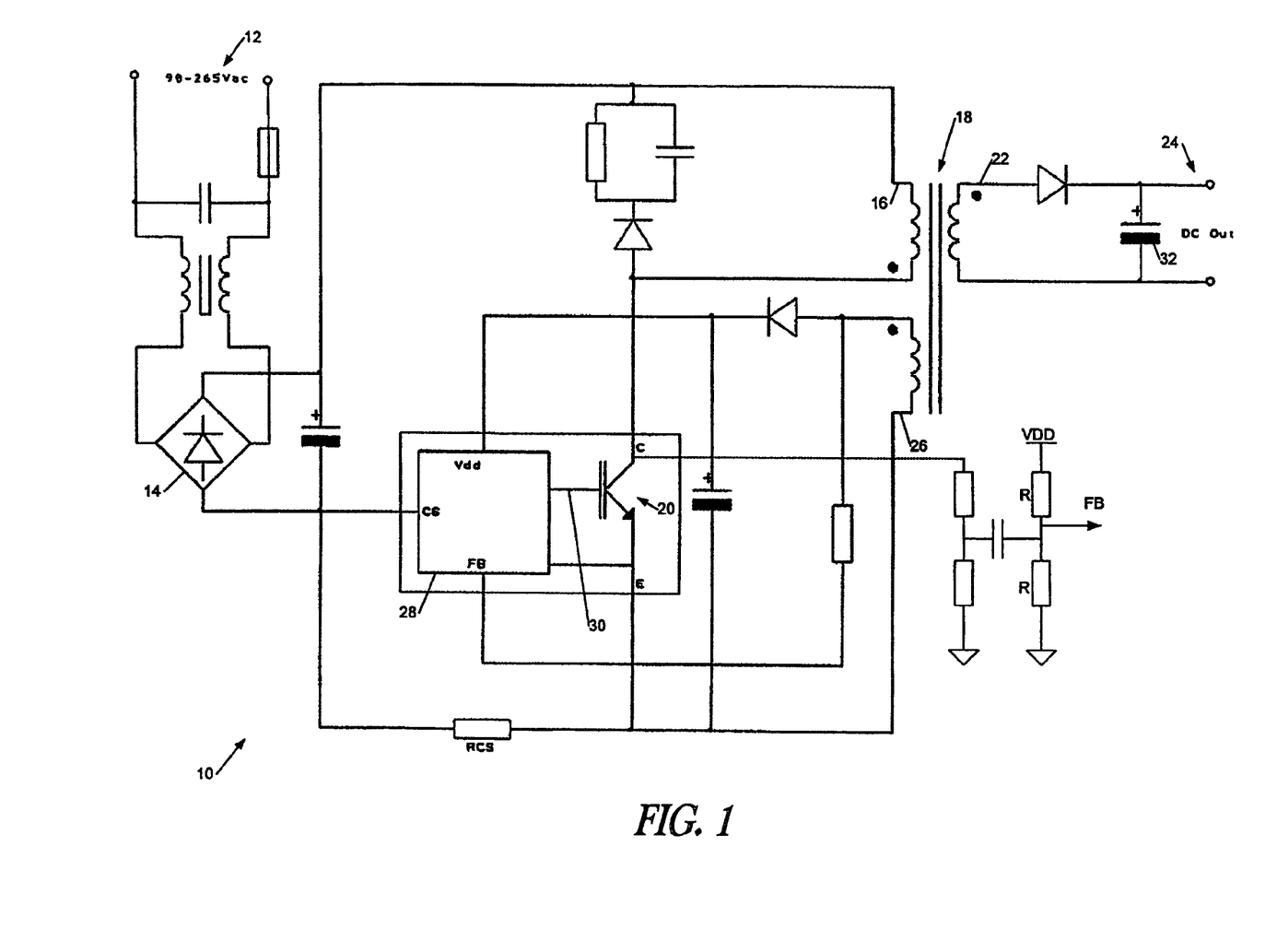
FIG. 1 shows an example of an SMPS incorporating primary-side sensing.

Referring now to FIG. 1, this shows an example of a switch mode power supply circuit 10 with primary side sensing. The power supply comprises an AC mains input 12 coupled to a bridge rectifier 14 to provide a DC supply to the input side of the power supply. This DC supply is switched across a primary winding 16 of a transformer 18 by means of a power switch 20, in this example an insulated gate bipolar transistor (IGBT). A secondary winding 22 of transformer 18 provides an AC output voltage which is rectified to provide a DC output 24, and an auxiliary winding 26 provides a feedback signal voltage proportionally to the voltage on secondary winding 22. This feedback signal provides an input to a control system 28, powered by the rectified mains. The control system provides a drive output 30 to the power switching device 20, modulating pulse width and/or pulse frequency to regulate the transfer of power through transformer 18, and hence the voltage of DC output 24. In embodiments the power switch 20 and controller 28 may be combined on a single power integrated circuit.

As can be seen, the primary side controlled SMPS of FIG. 1 derives feedback information from the primary side of the transformer, using an auxiliary winding to avoid high voltage signals, the voltage being stepped down by the turns ratio of the transformer. As the skilled person will appreciate, however, it is not necessary to employ a separate auxiliary winding although this may be convenient if such a winding is already contemplated to provide a low voltage supply to the controller. For example, a voltage of the primary winding may be sensed, preferably capacitor coupled so that it can be referenced to the ground of the controller, and stepped down using a potential divider. An example circuit for this is shown inset in FIG. 1, with a dashed connection to the primary winding 16. The skilled person will further appreciate that an auxiliary winding is not necessary to provide a dc supply for the controller as this may be derived from the high voltage dc supply on the primary side of the SMPS or in a number of other ways, for example using a capacitor charge pump driven via a diode from the switched voltage on the power switch. In some preferred implementations, therefore, the auxiliary winding is omitted.

We will describe techniques for using the auxiliary voltage waveform to generate feedback information for regulating an SMPS. In embodiments this facilitates operation across a wide range of input and output conditions.

SUMMARY OF THE INVENTION

According to a first aspect of the invention there is therefore provided a switch mode power supply (SMPS) controller for regulating the output of a discontinuous conduction mode (DCM) SMPS in response to a feedback signal from a winding of a magnetic energy storage device forming part of an output circuit of said SMPS, said feedback signal having an oscillatory portion when substantially no energy is being transferred to said SMPS output, the SMPS controller comprising: a reference level input to receive an output voltage reference level signal; a feedback signal input to receive said feedback signal, said feedback signal being responsive to a voltage on said winding; a first comparator coupled to said reference level input and to said feedback signal input and having an output responsive to a comparison of said reference level signal and said feedback signal; a timing signal generator coupled to said feedback signal input to identify a point in said oscillatory portion of said feedback signal and to provide a timing signal responsive to said identification; an integrator coupled to said feedback signal input and to said first comparator output and configured to start integration responsive to said comparison of said reference level signal and said feedback signal, to provide an integrated feedback signal output; a second comparator to compare said integrated feedback signal output at said time identified by said timing signal generator timing signal with a second reference value, and having an output to provide an error signal responsive to said comparison; and a controller output coupled to said second comparator output to provide a control signal for regulating said SMPS output responsive to said error signal.

The sensed winding may comprise an auxiliary winding of the magnetic energy storage device or, where the device comprises a transformer, a primary winding of the transformer.

In embodiments of the invention integration of the auxiliary voltage waveform is performed from a point determined by comparing the auxiliary voltage with a reference voltage. However in broad terms the start point may be determined by the actual and/or target operating voltage of the SMPS. Thus the start point can be determined by either comparing the feedback (auxiliary) voltage with a reference voltage or by finding a knee point in the feedback voltage with a slope detector or transformer flux reset point detector.

The integration may either be stopped at some known, later point or sampled at some known, later point and then, in effect, a comparison made between the integrated value and an expected result. Embodiments of the invention exploit the observation that in the oscillatory part of the auxiliary voltage wave form immediately following the decaying part of the wave form, that is in the post-conduction resonance part of the auxiliary voltage wave form some properties of the areas under the curve of this wave form are known. Thus, for example, over a cycle the total integrated area is zero. Similarly the area under, for example, a quarter cycle is known (providing the starting amplitude is known). Thus the integration may be stopped or sampled at a defined point in the non-conducting oscillatory phase of the auxiliary voltage wave form and the effect of having integrated over a part of the oscillatory portion of this wave form may be compensated for or may cancel out, depending upon the sampling point.

Thus in a first group of embodiments the timing signal generator includes a differentiator and the identified point comprises a peak or trough of the oscillatory portion of the feedback signal, for example, the first trough after the feedback signal has passed through zero. The integration may be stopped at this point or, alternatively, the output of the integrator may be sampled at this point. In this latter case, the output of the integrator may be compared with the value it was re-set to when the integration started, typically zero and a demand signal representing a load on the output side of the power supply generated according to whether the output of the integrator is above or below its re-set value. This demand signal can be used modulate the pulse width and/or frequency of a power switching device of the SMPS to regulate the output. In a variant, the time at which the integrated output reaches its re-set value, for example zero, the time at which the integrated output reaches it re-set value, for example zero, may be employed to generate the control or demand signal, for example by comparing this with a known timing such as the timing signal generated by the timing signal generator, in described embodiments a trough (or peak) of the oscillatory portion of the feedback signal. In a still further variant, if the integrator is stopped at a peak or trough of the feedback signal the output of the integrator may be used as an error signal to directly regulate the SMPS.

In another group of embodiments, rather than the timing signal identifying a peak or trough of the oscillatory portion of the feedback signal, instead a zero crossing of oscillatory portion of the feedback signal is identified. This then defines an area under the oscillatory portion of the curve of one quarter of a cycle or, more generally, of an integral number of quarter cycles. The area under a quarter cycle varies with the peak at the start of the quarter cycle, and hence with the desired output voltage, more particularly with the output voltage reference level signal. Nonetheless this area may be determined and substrated from or compared with the total integrated value (to derive an error signal) or, as previously described, the integrator output may be sampled at this point. In a particularly convenient implementation the integrator and second comparator are combined to integrate a difference between the feedback signal and the second reference value, and in this case the second reference value may be set equal to or dependent upon the output voltage reference level signal.

In a related aspect the invention also provides an SMPS controller comprising: a winding signal input to receive a winding voltage waveform from a winding of a magnetic energy storage device of the SMPS; an integrator coupled to said winding signal input to integrate said winding voltage waveform; a reference voltage input to receive a reference voltage signal; a first comparator coupled to said winding signal input, to said reference voltage input and to said integrator to reset said integrator responsive to a comparison between said winding voltage waveform and said reference voltage signal; a timing circuit to generate a timing signal at a timing point in said winding voltage waveform; and a control output to provide an SMPS control signal responsive to a value of said integrated winding voltage waveform at said timing point.

The invention further provides a method of regulating the output of a switch mode power supply (SMPS) operating in a discontinuous conduction mode, the method comprising: monitoring a feedback signal from a primary or auxiliary winding of a magnetic energy storage device forming part of an output circuit of said SMPS, said feedback signal including a decaying portion representing a decaying voltage in said output circuit of said SMPS followed by an oscillatory portion when substantially no energy is being transferred to said SMPS output; integrating said feedback signal from a point in said decaying portion of said feedback signal defined by a target output voltage for said SMPS; and regulating said SMPS output responsive to a comparison, at a defined point in said oscillatory portion of said feedback signal, of a result of said integrating with a second, reference value.

The invention still further provides a system for regulating the output of a switch mode power supply (SMPS) operating in a discontinuous conduction mode, the system comprising: means for monitoring a feedback signal from a primary or auxiliary winding of a magnetic energy storage device forming part of an output circuit of said SMPS, said feedback signal including a decaying portion representing a decaying voltage in said output circuit of said SMPS followed by an oscillatory portion when substantially no energy is being transferred to said SMPS output; means for integrating said feedback signal from a point in said decaying portion of said feedback signal defined by a target output voltage for said SMPS; and means for regulating said SMPS output responsive to a comparison, at a defined point in said oscillatory portion of said feedback signal, of a result of said integrating with a second, reference value.

Preferably the second reference value comprises a substantially fixed reference value.

The invention also provides an SMPS including an SMPS controller as described above.

According to a still further aspect the invention provides a power converter comprising: a transformer and a switch that electrically couples and decouples the transformer to and from a power source; and a sensing module to indirectly sense an output voltage of said power converter and thereby regulate an output of said power converter; wherein said sensing module is configured to integrate part of a primary or auxiliary winding flyback voltage waveform of the transformer between two points, said two points including a resonant portion of said voltage waveform, such that when in regulation said part of said waveform between said two points has an integrated value of substantially zero.

According to a still further aspect the invention provides a power converter comprising: a transformer and a switch that electrically couples and decouples the transformer to and from a power source; an event detection module for generating a reference voltage timing signal indicating when a primary or auxiliary winding flyback voltage waveform of the transformer substantially equals a reference voltage; an integration module for generating a signal indicating when said flyback voltage waveform has reversed phase starting from a timing point indicated by said reference voltage timing signal; a critical conduction point detector for generating a second signal indicating when a critical conduction point has been reached; and a phase detection circuit for generating an error signal which indicates a relative timing of the outputs of said integration module and said critical conduction point detector.

The skilled person will appreciate that the above-described techniques may be employed in a wide variety of SMPS architectures including, but not limited to, a flyback converter and a direct-coupled boost converter. In some implementations (as mentioned) the magnetic energy storage device comprises a transformer with primary, secondary, and auxiliary windings but in other implementations an auxiliary winding may be provided on another inductor of the SMPS. In still other implementations an auxiliary winding may be omitted and the sensing signal derived from a primary winding, for example as described above with reference to FIG. 1.

In some embodiments an SMPS controller as described above is implemented mainly using analogue circuitry, in particular for the integration, differentiation, and comparison operations. However, in other embodiments an SMPS controller as described above may be implemented using digital circuitry. Thus the invention further provides processor control code, such as RTL or SystemC, in particular on a carrier medium, to define hardware to implement such circuitry.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

We will describe SMPS control systems which can achieve optimum output voltage regulation with primary side feedback while operating across a wide range of input and output conditions. Broadly speaking we will describe an SMPS controller which integrates a feedback signal from a point determined by a target operating voltage to a peak or trough of an oscillatory or resonant portion of the feedback signal when substantially no energy is being transferred to the SMPS output. When regulation is achieved this value should be zero; the difference from zero can be used to regulate the output voltage of the SMPS.

In more detail, we will describe an apparatus and method for extracting SMPS output voltage information from a primary winding on a transformer of the SMPS. A differentiator differentiates the voltage waveform from the primary winding. A first comparator senses the zero crossing of the differentiator output, detecting what we refer to as a critical conduction (CRM) point. A comparator compares the primary voltage waveform with a reference voltage producing a RESET signal. When the RESET signal goes inactive the integrator integrates the primary voltage waveform from a pre-defined reset value. A second comparator compares the output of the integrator with the reset value, producing a timing signal. A circuit then compares the phase of the timing signal with respect to the critical conduction point, producing a logic signal DEMAND, which can be used to control the power supply.

We first describe an operating principle of the SMPS controller.

The controlled SMPS includes a magnetic device and a power switch to switch power to the magnetic device. The magnetic device has a sensing winding, which may comprise an auxiliary winding of an inductor or transformer or a primary winding of a transformer. In order to derive feedback information from the sensing, say auxiliary, winding waveform the target operating voltage of the converter and the actual operating voltage of the converter are determined. The method indirectly determines a mismatch between those two voltages by detecting the critical conduction (CRM) point in the sensed voltage waveform.

In, for example, a flyback converter, the secondary winding voltage at the end of the secondary current conduction is equal to the output voltage plus the secondary rectifier forward voltage drop. Subsequently the residual energy in the transformer will give rise to an oscillatory voltage waveform whose resonant frequency is defined by the transformer primary inductance and associated parasitic capacitance. The area under the first half cycle of this oscillation, in the auxiliary voltage waveform, will be zero assuming negligible damping. Therefore if the auxiliary voltage waveform is integrated from the secondary zero current (SCZ) point the integrator will give the first zero crossing at the first valley point (i.e. CRM point) of the waveform. That is, referring to FIG. 3, integration from point X to point Y of the auxiliary voltage waveform (Vaux) will give substantially zero. Moreover a differentiator will also produce a zero crossing point at the CRM point as the slope of the auxiliary voltage waveform is zero at that point. Using this principle the exact operating point and the target operating point of the converter can be found. For example, if the integration begins at a point before X in FIG. 3, determined by Vref (which sets a desired output voltage), the additional area under the Vaux curve defines the operating point of the power supply (and the integral will reach zero later, as shown by Vint).

We now describe an implementation of the above described operating principle in an SMPS controller.

Figure 2A:
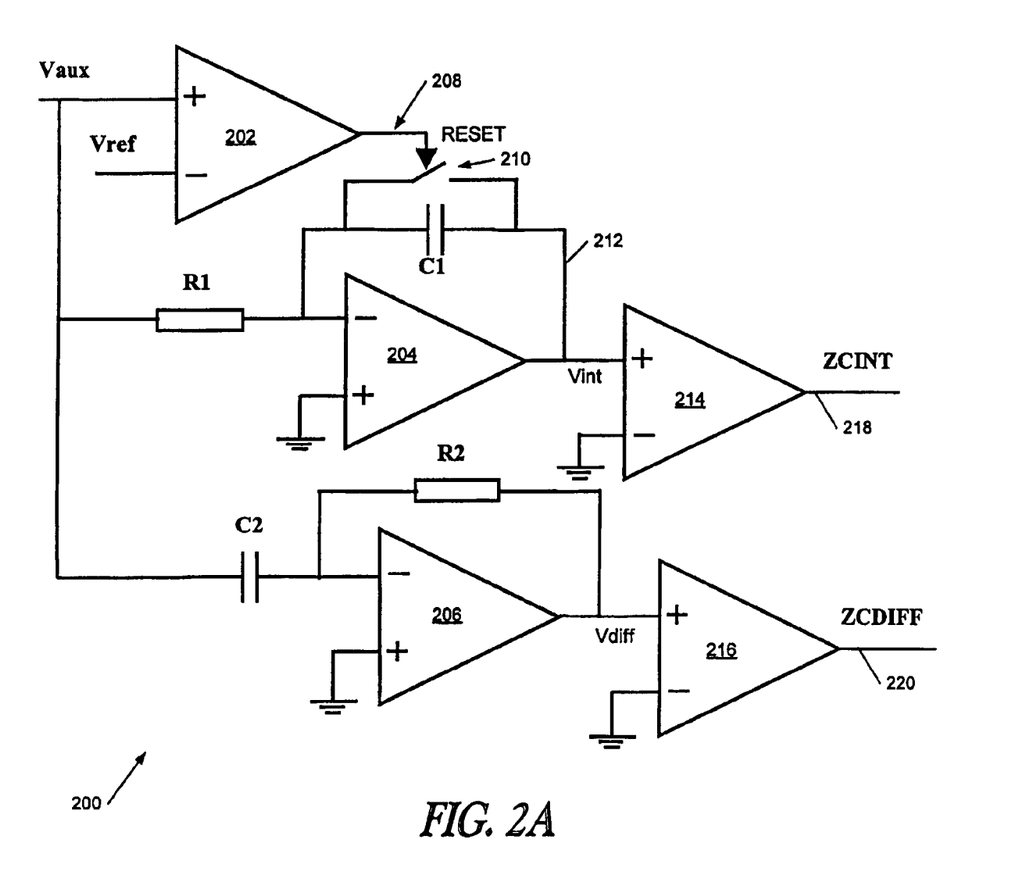
FIGS. 2a and 2b show, respectively, a schematic circuit diagram of an SMPS controller according to a embodiment of the invention, and a circuit for generating a DEMAND signal.
Figure 3:
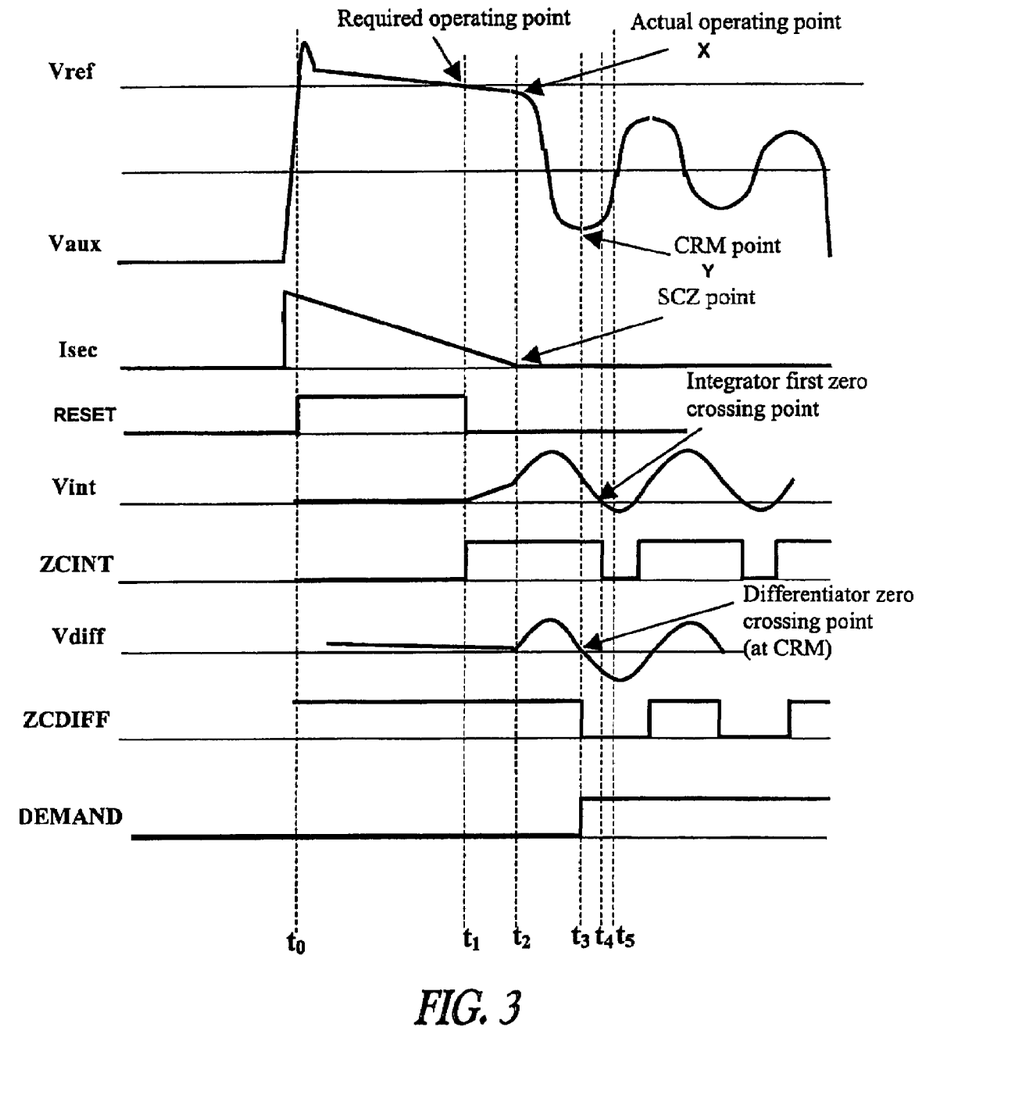
FIG. 3 shows timing waveforms for the controller of FIG. 2.

FIG. 2a shows a schematic circuit diagram of the analogue blocks of the controller 200; the timing diagrams are shown in FIG. 3.

Referring to FIG. 2a, the auxiliary voltage (Vaux) is fed to the RESET comparator 202, an integrator 204 and a differentiator 206. The RESET comparator samples the auxiliary voltage waveform at target operating point by comparing it to a reference voltage ($V_{ref}$) to generate an RESET signal 208. The RESET signal is then used to reset the integrator by means of switch 210 in order to start integrating at the target operating point. The integrator output 212 is then fed to a zero crossing detector 214 (which compares with a zero reference). Therefore the output of the zero crossing detector will indicate the points when the integrator output becomes zero.

The differentiator 206 indicates change in slope along the auxiliary voltage waveform. The differentiator output is fed to a second zero crossing detector 216 that indicates the maximum and minimum points along the auxiliary waveform.

When the error between the actual and target operating points is zero both integrator (Vint) and differentiator (Vdiff) outputs will zero cross at the CRM point (see FIG. 3). If the actual operating point is below the target operating point the integrator will integrate more positive area resulting in the first zero crossing point being delayed with respect to the CRM point (as shown at point t4 in FIG. 3). On the other hand if the actual operating point is above the target operating point the zero crossing point of the integrator will have an early zero crossing with respect to the CRM point.

The SMPS may be controlled either by the timing of ZCINT, where Vint crosses zero, or alternatively by the value of Vint at a particular time, for example t3 in FIG. 3, the CRM point. Both these indicate the demand made by the load on the output side of the SMPS, and may be used to control the pulse frequency and/or period of an oscillator driving a power switch of the SMPS.

Figure 2B:
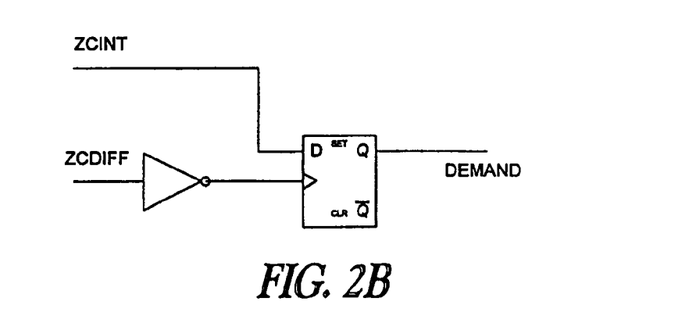

In one embodiment the ZCINT signal 218 is sampled at the CRM point (given by ZCDIFF 220) and in this way the polarity of the feedback error can be identified and, for example, a DEMAND signal generated which indicates the DEMAND of the converter, as shown in FIG. 3. This single bit information may, for example, be processed using a single bit operated digital algorithm to control the power switch of the converter. For further details reference may be made to the applicant's co-pending applications PCT/GB2005/050244, PCT/GB2005/050242, GB 0513772.4, and GB 0526118.5 (all of which applications are hereby incorporated by reference in their entirety). FIG. 2b shows an example of a circuit which may be employed to sample the ZCINT signal 218 to generate the DEMAND signal (the latch may be reset at any convenient time).

We next describe the timing diagram of FIG. 3 in more detail.

A typical discontinuous mode flyback auxiliary voltage waveform (Vaux) is shown at the top of FIG. 3 followed by the secondary current waveform (Isec). The secondary current becomes zero at t=$t_2$. The auxiliary voltage is sampled by $V_{ref}$ at t=$t_0$ and $t_1$. The RESET comparator is high during $t_0$ to $t_1$ period as $V_{aux}$>$V_{ref}$. RESET is used to reset the integrator (Vint). Therefore the integrator starts integrating the $V_{aux}$ only after RESET becomes zero at t=$t_1$. The area between $t_1$ and $t_2$ is approximately trapezoidal resulting an approximately linear integral up to t=$t_2$. After $t_2$ $V_{int}$ becomes sinusoidal with a 90° phase lag with respect to $V_{aux}$. This sinusoid is shifted above or below zero level depending on when the integration is started. If the integration is started before $t_2$ the sinusoid will be shifted above the zero level whereas if the integration is started after $t_2$ the sinusoid will be shifted below the zero level. This will determine the position of the first zero crossing of the $V_{int}$ (at t=$t_4$) with respect to the CRM point (t=$t_3$). ZCINT provides zero crossing information of the $V_{int}$ signal to the digital controller.

$V_{diff}$ gives the slope of the $V_{aux}$ at a particular point. Up to t=$t_2$ $V_{diff}$ is substantially linear. However after t=$t_2$ $V_{diff}$ is substantially sinusoidal with a 90° phase lag with respect to the $V_{aux}$. $V_{diff}$ has a zero crossing at t=$t_3$ irrespective of the operating point of the converter. ZCDIFF provides zero crossing information for the $V_{diff}$ signal to the digital controller.

According to the timing diagram $t_3$ and $t_4$ do not coincide. Furthermore at t=$t_3$ ZCINT is equal to one. This indicates the actual operating point (at t=$t_2$) being below the target operating point (at t=$t_1$) and need for an increase in the output. Therefore (in this example) the DEMAND is set to high at t=$t_3$.

To now recap the theory of operation, the area under the auxiliary voltage waveform starting from the secondary current zero point to critical conduction point is equal to zero assuming negligible damping. The actual operating point of the power converter (plus a voltage drop due to the secondary rectifier) can be found at the point when the secondary current is zero. Therefore if the converter is operating at the target operating point (voltage) the area integrated starting from the actual operating point will be zero at the critical conduction point. However if the operating point of the converter is shifted the integral will not be zero at the critical conduction point.

Moreover the slope of auxiliary voltage waveform will be zero at the critical conduction point. This leads to the differential of the auxiliary voltage being zero at that point irrespective of the operating point of the converter. Therefore using an integral and differential of the auxiliary voltage waveform feedback error of a power converter can be found accurately.

Figure 4:
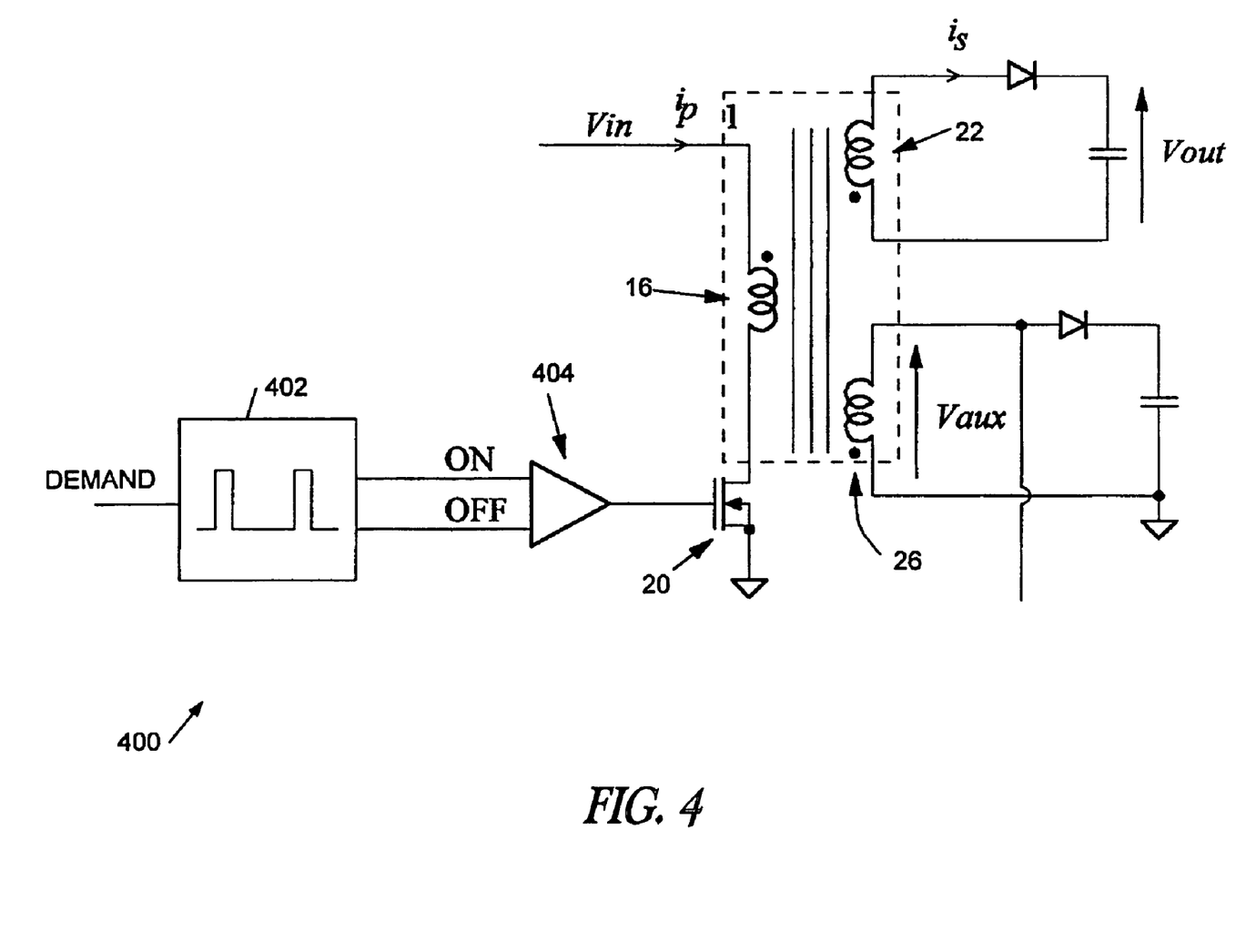
FIG. 4 shows an SMPS pulse generator and drive circuitry for use with the controller of FIG. 2 to implement a flyback SMPS.

The controller may implemented at FPGA level for a range of SMPS architectures including, but not limited to the flyback converter architecture discussed. FIG. 4 illustrates a portion of a flyback converter architecture 400 which may include an SMPS controller as described above (compare FIG. 1, in which like elements are indicated by like reference numerals). The flyback converter architecture 400 comprises a flyback transformer having a primary winding 16, a secondary winding 22 and an auxiliary winding 26. The secondary winding is connected to a rectifier and smoothing capacitor to provide the output voltage; the auxiliary winding may similarly be connected to a rectifier and smoothing capacitor to provide power to the control circuitry, as well as providing an auxiliary winding ("primary-side") sensing signal. As shown, the secondary winding is usually physically isolated from the primary and auxiliary windings and their associated components to meet legislative safety requirements. The DEMAND signal, or another error signal derived from Vint as indicated above, provides an input to a pulse generator 402 which drives a gate driver 404. The pulse generator 402 varies the duty cycle of switching transistor 20 (in this example a MOSFET) by adjusting the timing of the ON and OFF pulses output to the gate driver.

The techniques we have described provide a stable and accurate way of detecting the feedback error of a primary side sensing SMPS, with a only a small number of components in the feedback loop. No doubt many other effective alternatives will occur to the skilled person. It will be understood that the invention is not limited to the described embodiments and encompasses modifications apparent to those skilled in the art lying within the spirit and scope of the claims appended hereto.

All documents, patents, and other references listed above are hereby incorporated by reference for any purpose.

We claim:

1. A method of regulating the output of a switch mode power supply (SMPS) operating in a discontinuous conduction mode, the method comprising:
   monitoring a feedback signal from at least one of a primary winding and an auxiliary winding of a magnetic energy storage device forming part of an output circuit of said SMPS, said feedback signal including a decaying portion representing a decaying voltage in said output circuit of said SMPS followed by an oscillatory portion when substantially no energy is being transferred to said SMPS output;
   comparing said feedback signal with a reference dependent on a target output voltage to identifying a point in said decaying portion of said feedback signal defined by said target output voltage for said SMPS;
   resetting an integrator at said identified point;
   integrating said feedback signal using said integrator starting from said identified point; and
   regulating said SMPS output responsive to a comparison, at a defined point in said oscillatory portion of said feedback signal, of a result of said integrating with a second reference value.

2. The method of claim 1, wherein regulating includes regulating said feedback signal between two amplitudes such that said feedback signal maintains an integrated value of substantially zero.

3. The method of claim 1, wherein integrating includes integrating after said feedback signal is less than or equal said output voltage.

4. The method of claim 1, wherein regulating includes generating a reset signal when said feedback signal is greater than said target output voltage.

5. The method of claim 1, further comprising generating, from said integrating, a digital demand signal defining whether said output of said switch mode power supply is above or below said target output voltage, and wherein said regulating includes regulating a duty cycle of a signal generator controlling switching of a power switching device of said switch mode power supply in response to said digital demand signal.

6. The method of claim 1 wherein said regulating comprises comparing a value resulting from said integrating with a reference value dependent on said target output voltage.

7. The method of claim 1 wherein said regulating comprises comparing a timing of a zero-crossing point of said integrating with a timing of a critical conduction point in said oscillatory portion of said feedback signal.

8. A system for regulating the output of a switch mode power supply (SMPS) operating in a discontinuous conduction mode, the system comprising:
   means for monitoring a feedback signal from at least one of a primary winding and an auxiliary winding of a magnetic energy storage device forming part of an output circuit of said SMPS, said feedback signal including a decaying portion representing a decaying voltage in said output circuit of said SMPS followed by an oscillatory portion when substantially no energy is being transferred to said SMPS output;
   means for comparing said feedback signal with a reference dependent on a target output voltage to identify a point in said decaying portion of said feedback signal defined by said target output voltage for said SMPS;
   an integrator to integrate said feedback signal starting from said identified point means for resetting said integrator at said identified point; and
   means for regulating said SMPS output responsive to a comparison, at a defined point in said oscillatory portion of said feedback signal, of a result of said integrating with a second reference value.

9. The system of claim 8, wherein said means for integrating includes means for differentiating said feedback signal.

10. The system of claim 8, wherein said means for regulating includes a circuit for comparing a timing signal phase with a zero crossing point of a differential voltage waveform associated with said primary winding.

11. The system of claim 8, wherein said means for integrating includes means for producing a reset signal responsive to said target output voltage.

12. The system of claim 11, wherein said means for integrating includes means for generating a phase lag signal using said feedback signal, and wherein said means for generating is responsive to said means for producing a reset signal.

13. A power converter comprising:
   a transformer and a switch that electrically couples and decouples the transformer to and from a power source; and
   a sensing module to indirectly sense an output voltage of said power converter and thereby regulate an output of said power converter; wherein
   said sensing module is configured to integrate part of a primary or auxiliary winding flyback voltage waveform of the transformer between two points starting at a first said point, said two points including a decaying portion of a said voltage waveform and a resonant portion of said voltage waveform, such that when in regulation said part of said waveform between said two points has an integrated value of substantially zero;
   wherein said sensing module includes a reset circuit to reset said integration at said first said point in said decaying portion of said voltage waveform, said first said point being defined by a target output voltage for said power converter.

14. The converter of claim 13, wherein said sensing module includes two output nodes coupled to a digital controller, each node to provide zero crossing information to said digital controller.

15. The converter of claim 14, wherein one of said two output nodes is configured to provide zero crossing information based on a slope of said flyback voltage waveform.

16. The converter of claim 13, wherein said sensing module is configured to provide information for generating an error signal when out of regulation.

17. The converter of claim 13, wherein said sensing module is configured to substantially prevent said integration of said flyback voltage waveform if a magnitude of said flyback voltage waveform exceeds a target operating voltage.

* * * * *

UNITED STATES PATENT AND TRADEMARK OFFICE
CERTIFICATE OF CORRECTION

| | | |
|---|---|---|
| PATENT NO. | : 7,499,295 B2 | Page 1 of 1 |
| APPLICATION NO. | : 11/810739 | |
| DATED | : March 3, 2009 | |
| INVENTOR(S) | : Indika de Silva et al. | |

It is certified that error appears in the above-identified patent and that said Letters Patent is hereby corrected as shown below:

In column 9, line 38, in Claim 3, after "equal" insert -- to --.

Signed and Sealed this

Twenty-eighth Day of April, 2009

JOHN DOLL
*Acting Director of the United States Patent and Trademark Office*